(12) United States Patent
Sasaki et al.

(10) Patent No.: US 9,286,945 B2
(45) Date of Patent: Mar. 15, 2016

(54) DISK INFORMATION DISPLAY DEVICE

(75) Inventors: Tamotsu Sasaki, Hyogo (JP); Takashi Senoo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 2021 days.

(21) Appl. No.: 11/099,617

(22) Filed: Apr. 6, 2005

(65) Prior Publication Data

US 2005/0265160 A1 Dec. 1, 2005

(30) Foreign Application Priority Data

May 27, 2004 (JP) ................................ 2004-157976

(51) Int. Cl.
*G06F 3/00* (2006.01)
*G11B 27/34* (2006.01)

(52) U.S. Cl.
CPC ...................................... *G11B 27/34* (2013.01)

(58) Field of Classification Search
USPC ......................................................... 715/716
See application file for complete search history.

(56) References Cited

U.S. PATENT DOCUMENTS

| | | | | |
|---|---|---|---|---|
| 5,524,199 A * | 6/1996 | Orton et al. | ............ | 715/790 |
| 5,710,600 A * | 1/1998 | Ishii et al. | ............ | 348/563 |
| 6,820,238 B1 * | 11/2004 | Auflick et al. | ............ | 715/723 |
| 7,312,785 B2 * | 12/2007 | Tsuk et al. | ............ | 345/156 |
| 7,389,036 B2 * | 6/2008 | Kim et al. | ............ | 386/46 |
| 2002/0094191 A1 * | 7/2002 | Horie et al. | ............ | 386/46 |
| 2002/0138781 A1 | 9/2002 | Okuda et al. | | |
| 2002/0140720 A1 * | 10/2002 | Uno et al. | ............ | 345/716 |
| 2002/0140855 A1 * | 10/2002 | Hayes et al. | ............ | 348/465 |
| 2003/0169262 A1 * | 9/2003 | Lavelle et al. | ............ | 345/531 |

FOREIGN PATENT DOCUMENTS

| | | |
|---|---|---|
| JP | 5-325504 A | 12/1993 |
| JP | 2002-343067 A | 11/2002 |
| JP | 2004-17350 A | 1/2004 |

* cited by examiner

*Primary Examiner* — Anil N Kumar
(74) *Attorney, Agent, or Firm* — Birch, Stewart, Kolasch & Birch, LLP (57) ABSTRACT

A disk information display device capable of displaying display data responding to the operation of operating part in a complete and in real time, the disk information display device includes: a disk information acquiring unit for acquiring information recorded on a disk; an operating part for making a request to display data recorded on the disk in response to an operation; a control part that acquires display data responding to a final display request among display requests made during a period, in which display data responding to a former display request is acquired from the disk information acquiring unit, from the disk information acquiring unit when display requests are made in succession by the operation of operating part; and a display that displays the display data acquired by the control part after the display data responding to the former display request is displayed.

2 Claims, 5 Drawing Sheets

DISK INFORMATION DISPLAY DEVICE

BACKGROUND OF THE INVENTION

1. Field of the Invention

The present invention relates to a disk information display device for providing display based on data stored in a disk in response to user's operation.

2. Description of the Related Art

A disk information display device has been known that requests a disk information acquiring device (disk information acquiring unit) to acquire display data in response to a display request made by operating an operating part and provides display based on the display data transmitted from the disk information acquiring device in response to this request. Patent document 1 discloses a digital audio device, which conducts a search for desired music from among a plurality of music recorded in a digital audio medium by a music name, as one disk information display device like this.

This digital audio device includes storage means for storing all music names read from the digital audio medium in correspondence with their music numbers, a display part for displaying the music name of one music number, operating means for displaying the music names recorded in the digital audio medium in sequence one by one on the display part, a play key for providing an instruction of playing music of the music name displayed on the display part and a control part that reads a music name from the storage means and displays the music name on the display part when a request to display a music name is made by the operating means and that searches and plays music of the music name displayed on the display when the play key is operated during the display of a music name.

[Patent document] Japanese Unexamined Patent Publication No. 5-325504

By the way, in the disk information display device such as digital audio device disclosed in the above described patent document 1, when the time intervals of display requests which are made in succession by operating the operating part, are larger than the time required to perform a display processing of receiving display data from the disk information acquiring device in response to a display request and of displaying the display data on a display, the disk information display device can display the display data related to the display request on the display in real time and in a complete state.

However, when the time intervals of display requests which are made in succession by operating the operating part, are smaller than the time required to perform above described display processing, there are cases where the disk information display device can not display the display data related to the display request on the display in real time and in a complete state.

For example, when a next display request is made while display processing is being performed in response to one display request, a conventional disk information display device changes the display processing in response to the latter display request. Hence, there is presented a problem that display data relating to the former display request is displayed on the display in an incomplete state.

In order to avoid inconvenience like this, in another conventional disk information display device, when a next display request is made while display processing is being performed in response to one display request, a start of display processing relating to the latter display request is kept waiting until the display processing relating to the former display request is completed. According to this disk information display device, the problem that display data in an incomplete state is displayed on the display, is solved, but there is presented another problem that real-time response of the device has been impaired and is inferior in the following of display to the operation of operating part since the device takes time to display data responding to the operation of operating part.

SUMMARY OF THE INVENTION

The present invention has been made to solve the above described problems. The object of the present invention is to provide a disk information display device capable of displaying display data responding to operation of the operating part in a complete state and in real time.

A disk information display device in accordance with the present invention includes a disk information acquiring unit for acquiring information recorded on a disk; an operating part for making a request to display data recorded on the disk in response to an operation; a control part that acquires display data from the disk information acquiring unit responding to a final display request among display requests made during a period, in which display data responding to a former display request is acquired from the disk information acquiring unit, when display requests are made in succession by operation of the operating part; and a display that displays the display data acquired by the control part after the display data responding to the former display request is displayed.

According to the present invention, when display requests are made in succession by the operation of operating part, display data responding to a final display request among display requests made during a period, in which display data responding to a former display request is acquired from the disk information acquiring device, is acquired from the disk information acquiring unit and is displayed after the display data responding to the former display request is displayed. Therefore, it is possible to display the display data in a complete state and in real time.

DETAILED DESCRIPTION OF THE PREFERRED EMBODIMENT

Hereafter, the preferred embodiment of the present invention will be described in detail with reference to the drawings.

Embodiment 1

Figure 1:
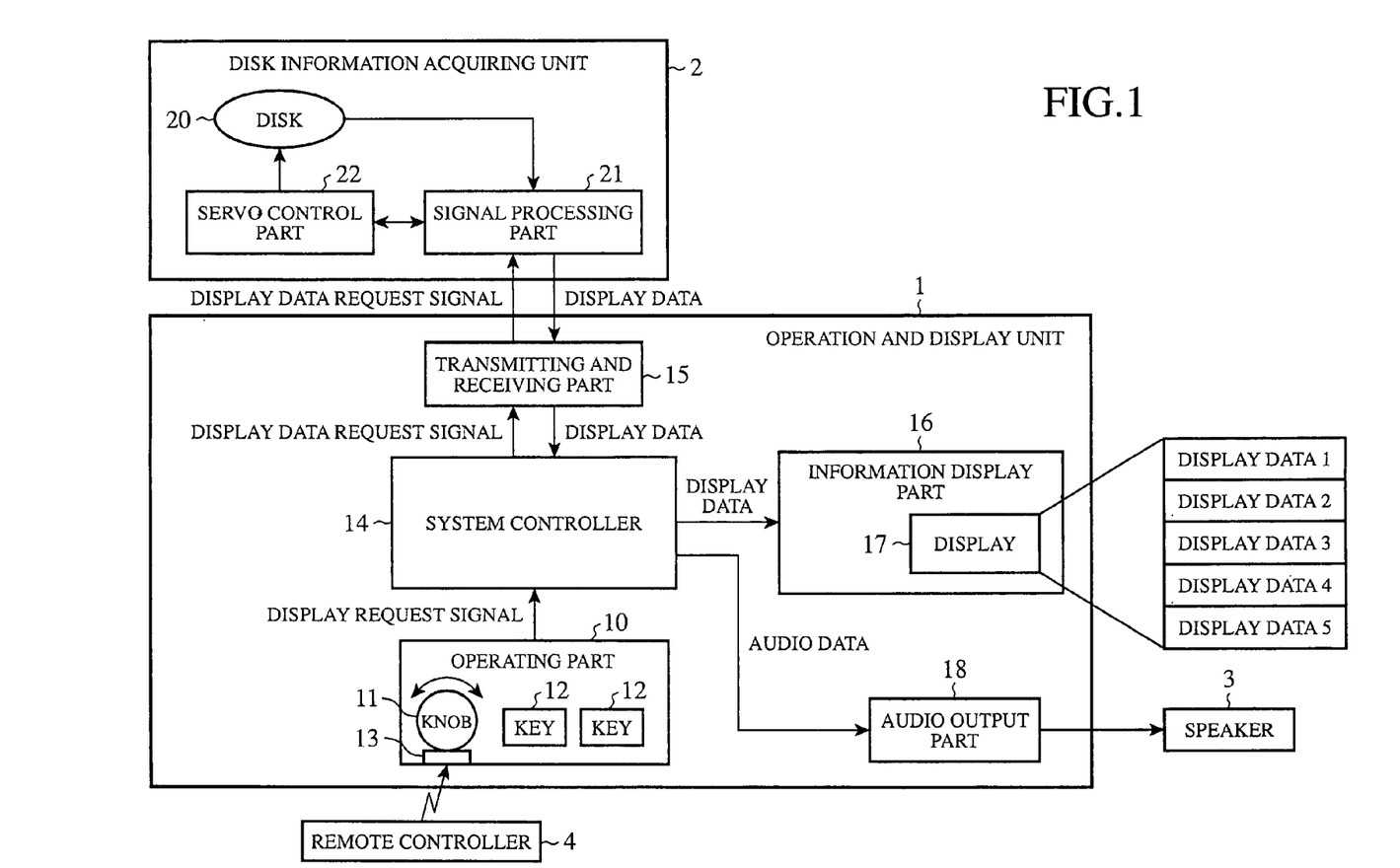
FIG. 1 is a block diagram to show the construction of a disk information display device in accordance with embodiment 1 of the present invention.

FIG. 1 is a block diagram to show the construction of a disk information display device in accordance with embodiment 1 of the present invention. This disk information display device is composed of an operation and display unit 1, a disk information acquiring unit 2, a speaker 3 and a remote controller 4, when broadly divided.

The operation and display unit 1 is constructed of an operating part 10, a system controller 14, a transmitting and receiving part 15, an information display part 16 and an audio output part 18.

The operating part 10 is used for user to control the disk information display device. This operating part 10 is provided with a knob 11, keys 12 and a remote-controller light receiving part 13. These knob 11, key 12 and remote-controlled light receiving part 13 are used for realizing various functions available by the disk information display device and, hereafter, a function of producing a display request signal directly relating to the present invention will be mainly described.

The knob 11 has a mechanism (not shown) of producing a clicking feeling at predetermined intervals when it is turned in the direction shown by arrow. The operating part 10 produces a display request signal every time when the knob 11 is turned and come to a position where a clicking feeling is produced. The key 12 is constructed of, for example, a push switch. The operating part 10 also produces a display request signal every time when this key 12 is pressed. The remote-controller light receiving part 13 receives infrared rays from the remote controller 4. The operating part 10 produces a display request signal every time when the infrared rays from the remote controller 4 are received by the remote-controller light receiving part 13. The display request signal produced by the operating part 10 is transmitted to the system controller 14.

Further, when the knob 11, the key 12 or the remote controller 4 is operated to select one display data from a plurality of display data (for example, music name data) displayed on a display 17, which will be described later, the operating part 10 produces a reproduction request signal of data (for example, music data) corresponding to the selected display data. The reproduction request signal produced by the operating part 10 is transmitted to the system controller 14.

The system controller 14 corresponds to a control part of the present invention. The system controller 14 is constructed of, for example, a micro processor and controls the whole operations of this disk information display device. For example, the system controller 14 produces a display data request signal in response to a display request signal which is transmitted from the operating part 10 and transmits the display request signal to the disk information acquiring unit 2 via the transmitting and receiving part 15. Further, the system controller 14 transmits display data (for example, music name data) which is transmitted from the disk information acquiring unit 2 via the transmitting and receiving part 15 in response to this display data request signal, to the information display part 16.

Further, the system controller 14 produces a reproduction data request signal in response to the reproduction request signal which is transmitted from the operating part 10 and transmits the reproduction data request signal via the transmitting and receiving part 15 to the disk information acquiring unit 2. Still further, the system controller 14 transmits audio data which is transmitted via the transmitting and receiving part 15 from the disk information acquiring unit 2 in response to this reproduction data request signal, to the audio output part 18. The detailed construction and operation of this system controller 14 will be described later.

The transmitting and receiving part 15 controls the transmitting and receiving of data between the system controller 14 and the disk information acquiring unit 2. That is, the transmitting and receiving part 15 transmits the display data request signal and the reproduction data request signal which is transmitted from the system controller 14, to the disk information acquiring unit 2 and transmits the display data which is transmitted from the disk information acquiring unit 2 in response to the display data request signal or audio data which is transmitted from the disk information acquiring unit 2 in response to the reproduction data request signal, to the system controller 14.

The information display part 16 has the display 17 which is constructed of, for example, LCD (Liquid Crystal Display). The information display part 16 displays display data which is transmitted from the system controller 14. On the display 17, for example, five display data 1 to 5 are displayed in succession.

The audio output part 18 produces an analog audio signal on the basis of audio data transmitted from the disk information acquiring unit 2 via the transmitting and receiving part 15 and the system controller 14. The audio signal produced by this audio output part 18 is transmitted to the speaker 3. The speaker 3 produces, for example, music sound on the basis of the audio signal which is transmitted from the audio output part 18.

The disk information acquiring unit 2 is constructed of a disk 20, a signal processing part 21 and a servo control part 22.

The disk 20 stores, for example, music name data representing the music names of a plurality of music and music data which is corresponding to the respective music. The music name data and music data read from this disk 20, is transmitted to the signal processing part 21.

The signal processing part 21 transmits a driving signal to the servo control part 22 in response to the display data request signal or the reproduction data request signal which is transmitted from the transmitting and receiving part 15 of operation and display unit 1. Further, the signal processing part 21 performs predetermined signal processing to the music name data and music data which are read from the disk 20 to produce display data and audio data. The display data produced by this signal processing part 21 is transmitted via the transmitting and receiving part 15 and the system controller 14 to the information display part 16 and the audio data is transmitted via the transmitting and receiving part 15 and the system controller 14 to the audio output part 18.

The servo control part 22 moves a pickup (not shown) to such a position of disk 20 that is indicated by the driving signal which is transmitted from the signal processing part 21. With this movement, music name data and music data are read from the disk 20 and they are transmitted to the signal processing part 21. The music name data and the music data, as described above, are subjected to the signal processing by the signal processing part 21 and then they are transmitted as display data and audio data to the transmitting and receiving part 15.

Next, the detailed construction of the system controller 14 which is included in the operation and display unit 1 will be described.

Figure 2:
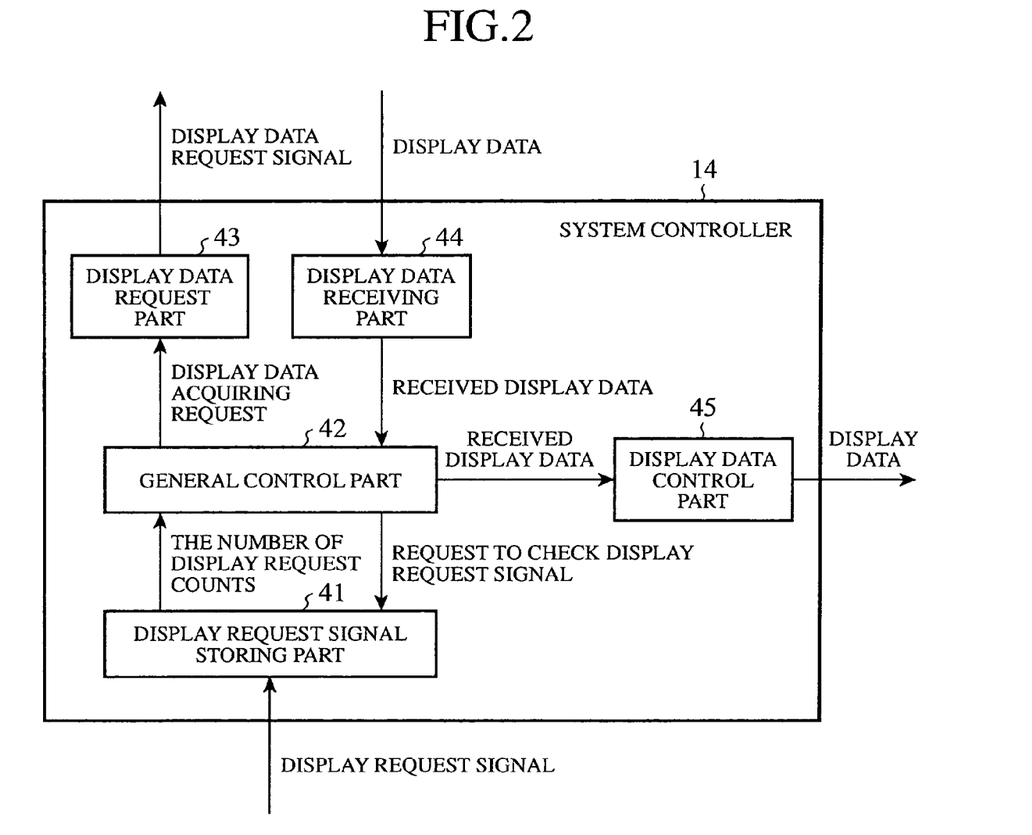
FIG. 2 is a block diagram to show the functional construction of a system controller shown in FIG. 1.

FIG. 2 is a block diagram to show the functional construction of system controller 14. The system controller 14 is constructed of a display request signal storing part 41, a general control part 42, a display data request part 43, a display data receiving part 44 and a display data control part 45.

The display request signal storing part 41 counts display request signals transmitted from the operating part 10 and stores them as the number of display request counts. Further, the display request signal storing part 41 transmits the number of display request counts stored to the general control part 42 in response to such a request to check the display request signal that is transmitted from the general control part 42.

The general control part 42 controls the whole operations of system controller 14. This general control part 42 transmits the request to check the display request signal to the display request signal storing part 41 and receives the number of request counts transmitted from the display request signal storing part 41 in response to this request to check the display request signal. If the number of display request counts received is one or more, the general control part 42 transmits a display data acquiring request to the display data request part 43. The general control part 42 receives received display data transmitted via the transmitting and receiving part 15 and the display data receiving part 44 from the disk information acquiring unit 2 in response to this display data acquiring request and transmits the received display data to the display data control part 45. The detailed operation of this system controller 14 will be later described with reference to a flow chart shown in FIG. 4.

The display data request part 43 produces a display data request signal in response to the display data acquiring request transmitted from the general control part 42 and transmits the display data request signal to the disk information acquiring unit 2 via the transmitting and receiving part 15. The display data receiving part 44 receives the display data transmitted from the disk information acquiring unit 2 via the transmitting and receiving part 15 and transmits the display data as received display data to the general control part 42. The display data control part 45 converts the received display data transmitted from the general control part 42 to display data of a form to be displayed on the display 17 and transmits the converted display data to the information display part 16.

Figure 3:
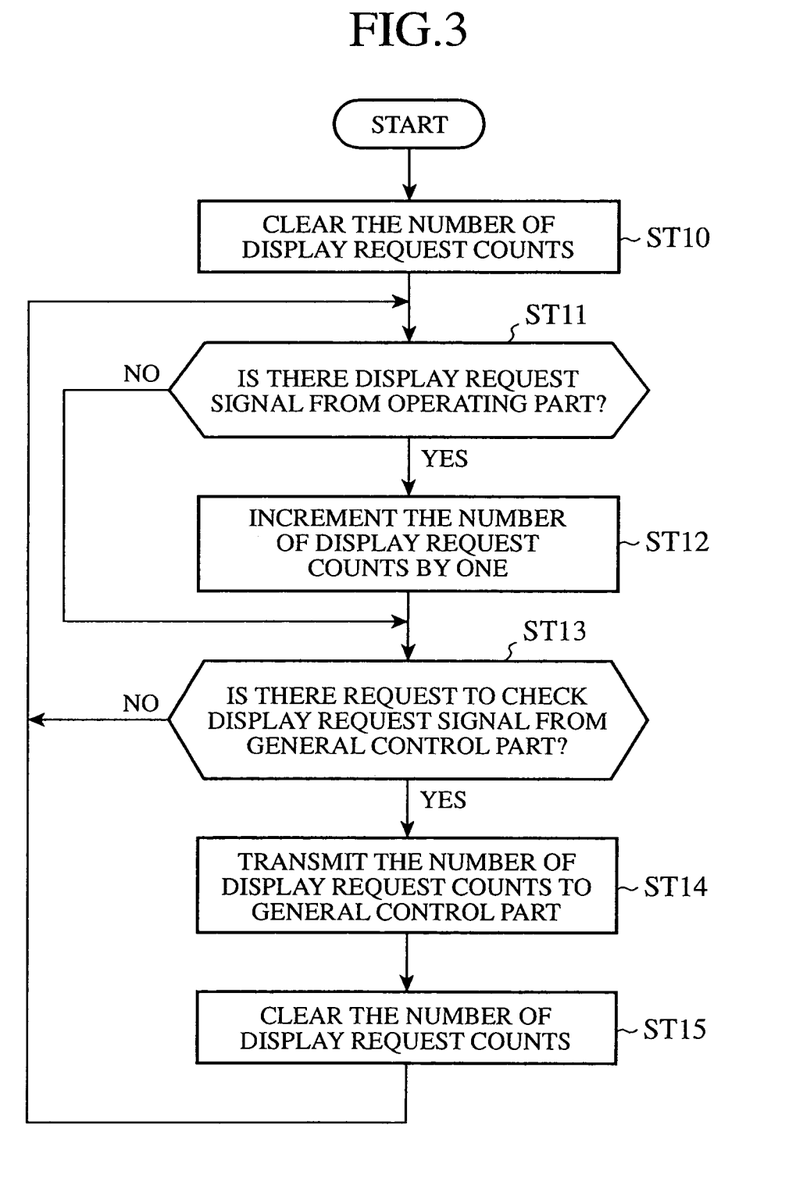
FIG. 3 is a flow chart to show the operation of a display request signal storing part shown in FIG. 2.
Figure 4:
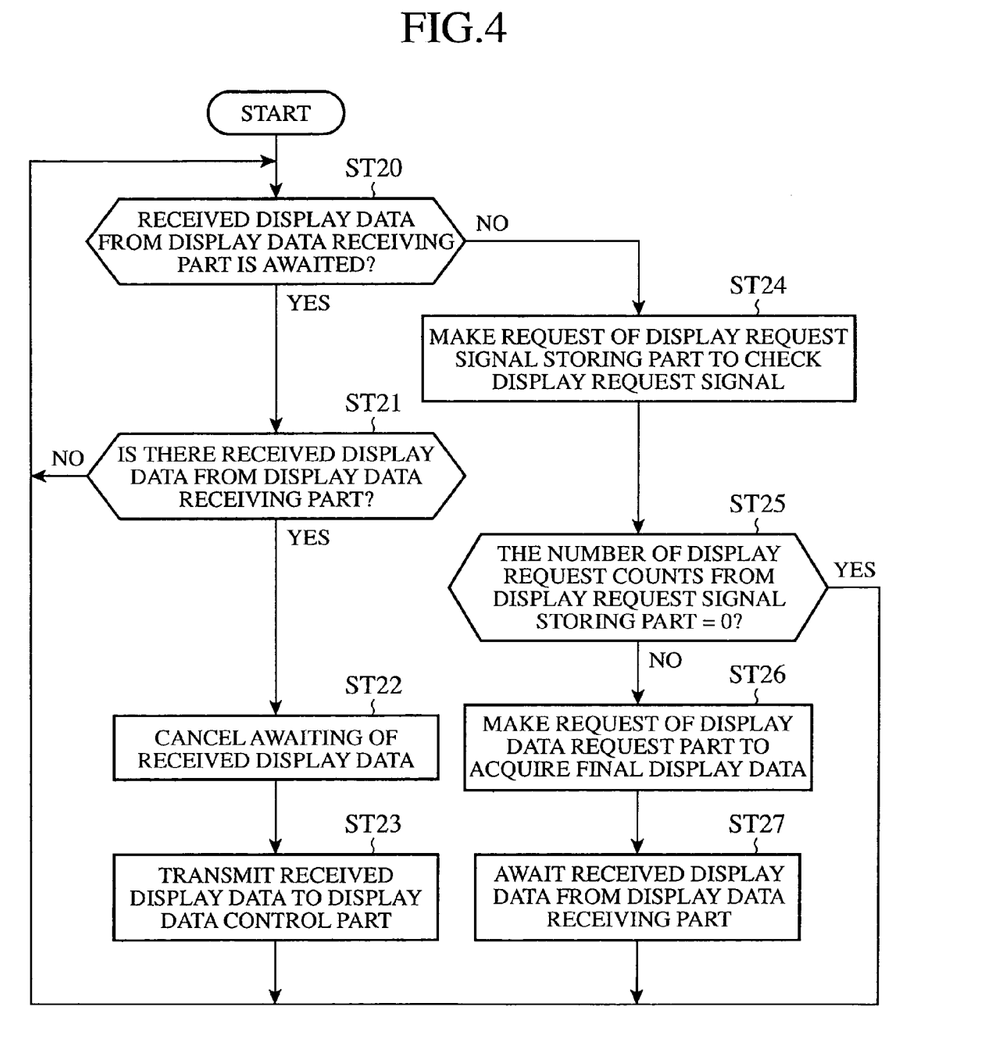
FIG. 4 is a flow chart to show the operation of a general control part shown in FIG. 2.

Next, the operation of disk information display device in accordance with embodiment 1 of the present invention, which is constructed in the manner described above, will be described with reference to flow charts shown in FIG. 3 and FIG. 4.

First, the operation of display request signal storing part 41 will be described with reference to the flow chart shown in FIG. 3. When the operation of disk information display device 41 is started, in the display request signal storing part 41, first, the number of display request counts is cleared (step ST10). The number of display request counts is the number of display request signals transmitted from the operating part 10 and is counted by a counter (not shown).

Next, it is checked whether or not there is a display request signal transmitted from the operating part 10 (step ST11). Here, if it is determined that there is not a display request signal, the sequence proceeds to step ST13. On the other hand, if it is determined that there is a display request signal, the number of display request counts is incremented by one (step ST12). Then, the sequence proceeds to step ST13.

At step ST13, it is checked whether or not the request to check the display request signal, is made by the general control part 42 (step ST13). Here, if it is determined that the request to check the display request signal is made, the number of display request counts is transmitted to the general control part 42 (step ST14). Next, the number of display request counts is cleared (step ST15). Then, the sequence returns to step ST11 and the above described operations are repeatedly performed. If it is determined at the above described step ST13 that the request to check the display request signal is not made, the sequence returns to step ST11 and the above described operations are repeatedly performed.

With the processing described above, the function of display request signal storing part 41 is realized: in other words, display request signal storing part 41 counts display request signals transmitted from the operating part 10, and stores the result as the number of display request counts, and transmits the number of display request counts stored in response to such a request to check the display request signal that is transmitted from the general control part 42, and then clears the number of display request counts.

Next, operation of the general control part 42 will be described with reference to the flow chart shown in FIG. 4. The general control part 42 firstly checks whether or not received display data from the display data receiving part 44, is awaited (step ST20). Here, if it is determined that received display data from the display data receiving part 44 is awaited, next, it is checked whether or not received display data is transmitted from the display data receiving part 44 (step ST21). Here, if it is determined that received display data is not transmitted, the sequence returns to step ST20.

On the other hand, if it is determined at step ST21 that received display data is transmitted from the display data receiving part 44, awaiting of the received display data from the display data receiving part 44, is cancelled (step ST22). Hence, in the next execution of step ST20, the result of determination is "NO". Next, the received display data is transmitted to the display data control part 45 (step ST23). Thereafter, the sequence returns to step ST20 and the above described operations are repeatedly performed.

If it is determined at the above described step ST20 that received display data is not awaited, then, the request to check the display request signal is transmitted to the display request signal storing part 41 (step ST24). Next, it is checked in response to this request to check the display request signal whether or not the number of display request counts transmitted from the display request signal storing part 41 is zero (step ST25). At this point, if it is determined that the number of display request counts is zero, it is recognized that the display request signal from the operating part 10 is not accumulated and the sequence returns to step ST20. In this case, display data displayed on the display 17 is not updated.

If it is determined at step ST25 in the process of performing the above steps ST20 ? ST 24 ? ST 25 ? ST 20 ?**** repeatedly that the number of display request counts is not zero, it is recognized that at least one display request signal from the operating part 10 is accumulated and a final display data acquiring request is made to the display data request part 43 (step ST26). At this point, the final display data acquiring request means a request to acquire display data responding to a display request signal finally counted up when the number of display request counts is two or more.

Next, the sequence is set that received display data from display data receiving part 44, is awaited (step ST27). Hence, in the next execution of step ST20, the result of determination is "YES". Thereafter, the sequence returns to step ST20 and the above described operations are repeatedly performed.

Figure 5:
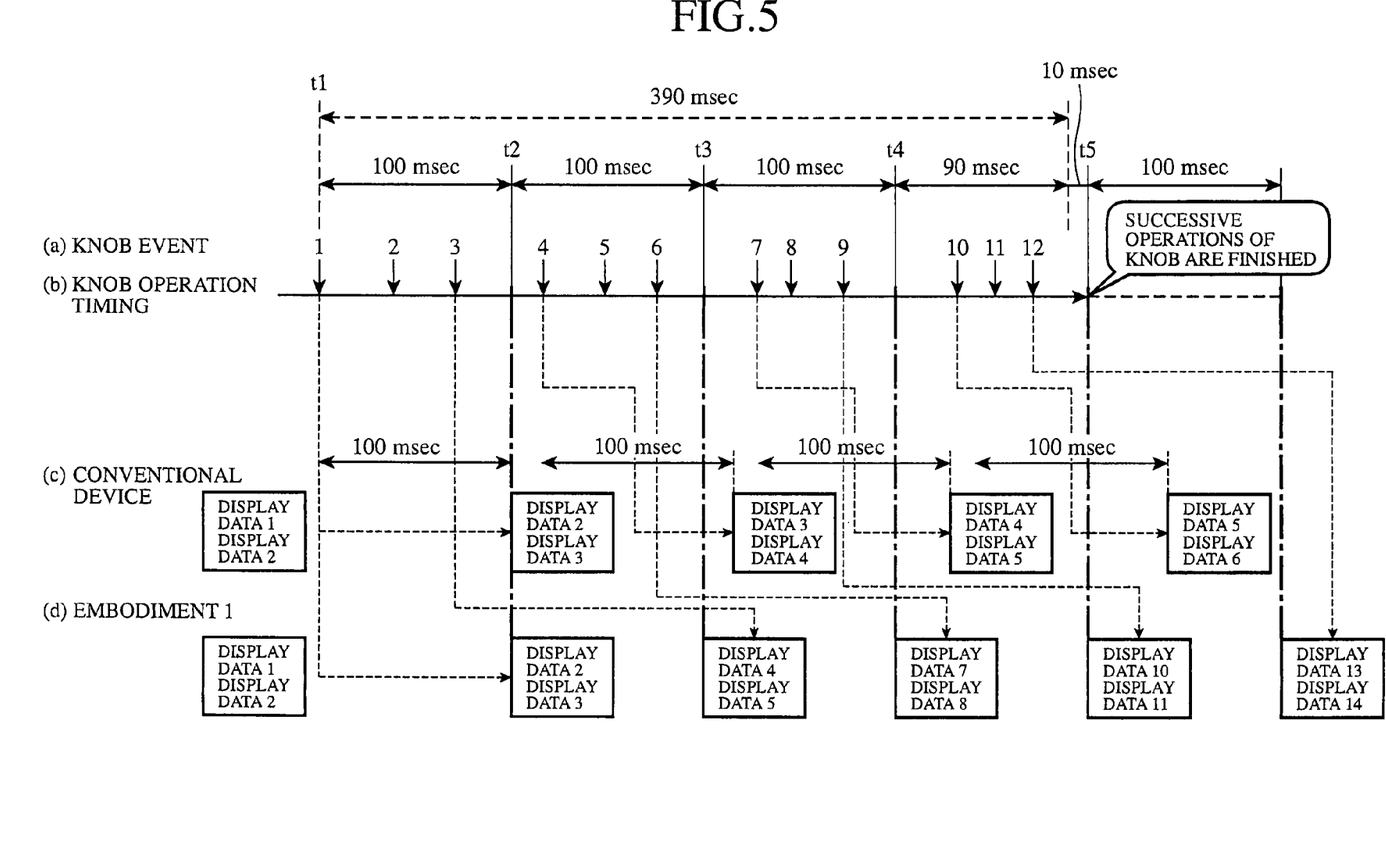
FIG. 5 is a timing chart to show the operation of the disk information display device in accordance with embodiment 1 of the present invention in comparison with a conventional disk information display device.

Next, in order to enhance understanding of the present invention, the operation of disk information display device in accordance with embodiment 1 of the present invention will be described in comparison with a conventional disk information display device with reference to a timing chart shown in FIG. 5.

Here, it is assumed in the following description that the knob 11 of operating part 10 is operated to produce a display request signal and that, for the sake of simplicity, two display data are displayed on the display 17. Further, it is assumed that a time of 100 msec elapses after the operation and display unit 1 transmits a display data request signal to the disk information acquiring unit 2 until the operation and display unit 1 receives display data.

First, the operation of conventional disk information display device will be described. It is assumed that in an initial state, as shown in FIG. 5(c), display data 1 and display data 2 are displayed on the display 17. If one assumption is made that the knob 11 is turned at high speed from this initial state (time t1) and is stopped after 400 msec (time t5) as shown in FIG. 5(b), knob events 1 to 12 occur in succession as shown in FIG. 5(a). Then, display request signals are produced in response to the respective knob events.

Processing of advancing (for example, rolling up) the display of display data by one, is started in response to a knob event 1 at time t1 and display data 2 and display data 3 are displayed on the display 17 at the time t2 after 100 msec. However, because processing responding to the knob event 1 is being performed during a period from time t1 to time t2, knob events 2 and 3 which are occurred during the period, can not be received but are neglected.

Next, when the display of display data 2 and display data 3 is completed at time t2, there is bought about a state where the next knob event can be received, so that a knob event 4 is received and the processing of advancing the display of display data by one is started in response to the knob event 4 and display data 3 and display data 4 are displayed on the display 17 after 100 msec. Display data is displayed in sequence in the same manner and when the operation of knob 11 is completed, display data responding to a knob event 10 is displayed. In this case, it is four knob events that are received, so display data 5 and display data 6 of a state in which the display of display data is advanced by four from the initial state, are displayed on the display 17.

Essentially, when all twelve knob events are received and the operation of knob 11 is completed, display data 13 and display data 14 of a state in which the display of display data is advanced by twelve from the initial state are to be displayed on the display 17, but as described above, display data 5 and display data 6 are displayed on the display 17. Hence, the user feels that the device is inferior in follow-up because display is not advanced considering that the knob 11 is turned at high speeds.

In contrast to the conventional disk information display device like this, the disk information display device of the present invention is operated in the following manner. It is assumed that in an initial state, as shown in FIG. 5(d), display data 1 and display 2 are displayed on the display 17. It is assumed that the operation of knob 11 and the occurrence of knob events are the same as in the above described conventional disk information display device.

Processing of advancing (for example, rolling up) the display of display data by one is started in response to a knob event 1 at time t1 and display data 2 and display data 3 are displayed on the display 17 at time t2 after 100 msec. Processing responding to the knob event 1 is being performed during a period from time t1 to time t2 and the number of knob events occurring during the period is accumulated as the number of display request counts. In this case, knob events 2 and 3 occur and hence the number of display request counts becomes "2".

Next, when the display of display data 2 and display data 3 is completed at time t2, the processing responding to the next knob event can be performed and hence display data 4 and display data 5 responding to a final knob event 3 among knob events occurring during the period from time t1 to time t2 are displayed on the display 17. The display data 4 and the display data 5 responding to a knob event 3 are acquired by advancing the display data 2 and the display data 3 displayed just before by the number of display request counts, that is, "2".

The display of display data is performed in sequence in the same manner and when the operation of knob 11 is completed, display responding to a knob event 12 is performed. In this case, the number of knob events to be processed is four and knob events not to be processed are counted as the number of display request counts and the display of display data is advanced by this number of display request counts. Hence, during the operation of knob 11, there occur cases where the processing of advancing the display of display data is not performed, but when the operation of knob 11 is completed, display data 13 and display data 14 in a state in which the display of display data is advanced by twelve from the initial state are displayed on the display 17.

Therefore, even if the knob 11 is turned at high speeds, when the operation of knob 11 is completed, the same state is brought about as a state where all twelve knob events are received, so the user feels that the device is superior in follow-up.

As described above, according to the disk information display device in accordance with embodiment 1 of the present invention, when the knob 11, the key 12, or the remote controller 4 of operating part 10 is operated to produce display request signals in succession, display data responding to a final display request signal among the display request signals, which are produced while display data responding to a former display request signal is being acquired from the disk information acquiring unit 2, is acquired from the disk information acquiring unit 2 and is displayed on the display 17 after the display data responding to the former display request signal is displayed.

Therefore, while display processing responding to the former display request signal is being performed, display processing responding to the next display request signal is not started, so display data can be displayed in a complete state. Further, when a next display request signal is produced while display processing responding to a former display request signal is being performed, the number of display request signals is counted as the number of display request counts and when display processing responding to the former display request signal is completed, display data is displayed which is advanced by the number of display request counts from display data displayed by display processing responding to the former display request signal, so display data responding to the amount of operation of operating part 10 is displayed and hence real-time performance is not lost. As a result, the display of display data excellently follows the operation of operating part 10.

Incidentally, this embodiment 1 has been described on the assumption that a plurality of display data are displayed on the display 17, but the number of display data displayed on the display 17 may be one.

The disk information display device in accordance with this embodiment 1 is especially effective, for example, when the amount of one display data is large or the number of display data to be displayed at a time on the display 17 is large, that is, when it takes a long time to perform the display processing of display data.

What is claimed is:

1. A disk information display device comprising:
   a disk information acquiring unit for acquiring information recorded on a disk;
   an operating part transmitting a user display request signal to advance the display of display data recorded on the disk in response to a user operation;
   a controller that acquires the display data from the disk information acquiring unit in response to a user display request signal;

a display request signal storing part that accumulates the number of user display request signals received in succession while the controller is acquiring display data in response to a former user display request signal; and a display that displays the display data acquired by the controller after the display data responding to the former display request signal is displayed, wherein the controller is configured to advance the display of the display data by the number of accumulated user display request signals stored in the display request signal storing part.

2. The disk information display device as claimed in claim 1, wherein the display data is constructed of a plurality of data that represent a plurality of items.

* * * * *